United States Patent
Listov-Saabye et al.

(10) Patent No.: US 9,095,157 B2
(45) Date of Patent: Aug. 4, 2015

(54) SWEET CONFECTIONERY PRODUCTS

(75) Inventors: Francisca Listov-Saabye, Frederiksberg C (DK); Martin Kristensen, Galten (DK); Carl Bjarne Mikkelsen, Brabrand (DK); Nikolai Sandau, Malmö (SE)

(73) Assignee: TOMS GRUPPEN A/S, Ballerup (DK)

( * ) Notice: Subject to any disclaimer, the term of this patent is extended or adjusted under 35 U.S.C. 154(b) by 738 days.

(21) Appl. No.: 12/447,586

(22) PCT Filed: Nov. 9, 2007

(86) PCT No.: PCT/DK2007/050167
§ 371 (c)(1),
(2), (4) Date: Dec. 21, 2009

(87) PCT Pub. No.: WO2008/055510
PCT Pub. Date: May 15, 2008

(65) Prior Publication Data
US 2010/0104722 A1    Apr. 29, 2010

Related U.S. Application Data

(60) Provisional application No. 60/858,221, filed on Nov. 9, 2006.

(30) Foreign Application Priority Data

Nov. 9, 2006  (DK) ................................ 2006 01464

(51) Int. Cl.
*A23G 3/42*    (2006.01)
*A23L 1/0522*    (2006.01)
*A23G 3/38*    (2006.01)
*A23G 3/48*    (2006.01)

(52) U.S. Cl.
CPC .. *A23G 3/42* (2013.01); *A23G 3/38* (2013.01); *A23G 3/48* (2013.01); *A23V 2002/00* (2013.01); *A23V 2200/132* (2013.01); *A23V 2250/24* (2013.01); *A23V 2250/5114* (2013.01)

(58) Field of Classification Search
CPC ..... A23L 1/053; A23L 1/0532; A23L 1/0524; A23L 1/0522; A23L 1/05; A23G 3/42; A23G 3/36; A23G 3/38; A23G 3/48; A23V 2002/00; A23V 2250/5062; A23V 2250/51; A23V 2250/5114; A23V 2250/24; A23V 2200/132
USPC .................. 426/103, 575, 576, 548, 660, 573
See application file for complete search history.

(56) References Cited

U.S. PATENT DOCUMENTS

| | | | |
|---|---|---|---|
| 3,493,394 A * | 2/1970 | Linteris et al. ................. | 426/577 |
| 4,698,232 A | 10/1987 | Sheu et al. | |
| 4,933,189 A | 6/1990 | Cherukuri et al. | |
| 4,978,751 A | 12/1990 | Biton et al. | |
| 5,236,719 A | 8/1993 | Meyers et al. | |
| 5,342,631 A | 8/1994 | Yatka et al. | |
| 5,525,360 A | 6/1996 | Yatka et al. | |
| 6,365,209 B2 * | 4/2002 | Cherukuri ........................ | 426/72 |
| 6,423,358 B1 | 7/2002 | Barndt et al. | |
| 6,458,400 B1 | 10/2002 | Willibald-Ettle et al. | |
| 6,610,348 B2 | 8/2003 | Beyer et al. | |
| 6,967,037 B1 | 11/2005 | Jønsson et al. | |
| 2002/0051841 A1 | 5/2002 | Chiu et al. | |
| 2003/0026826 A1 | 2/2003 | Cherukuri et al. | |
| 2004/0086615 A1 * | 5/2004 | Johnson et al. ................ | 426/548 |
| 2004/0228951 A1 | 11/2004 | Schmidt | |
| 2005/0089618 A1 | 4/2005 | Bernard et al. | |

FOREIGN PATENT DOCUMENTS

| | | |
|---|---|---|
| EP | 0 366 248 A2 | 5/1990 |
| EP | 0 246 628 B1 | 6/1991 |
| EP | 0 273 001 B1 | 12/1992 |
| EP | 0 438 912 B1 | 3/1994 |
| EP | 0 371 584 B1 | 2/1995 |
| EP | 0 377 278 B1 | 8/1995 |
| EP | 0 447 359 B1 | 8/1995 |
| EP | 1 104 652 A1 | 6/2001 |
| EP | 1 210 880 A1 | 6/2002 |
| EP | 1 117 304 B1 | 7/2002 |
| EP | 1 629 730 A1 | 3/2006 |
| EP | 1 645 196 A1 | 4/2006 |
| EP | 1 652 436 A1 | 5/2006 |
| EP | 1 023 841 B1 | 8/2006 |
| FR | 2876003 A1 * | 4/2006 |
| JP | 59-216549 A2 | 12/1984 |

(Continued)

OTHER PUBLICATIONS http://www.fao.org/docrep/V5030E/V5030E0m.htm Chapter 8, section 8.6 Fruit sugar preserves technology; jams, jellies, marmalade, fruit paste, 1995, pp. 8.*
USDA National Nutrient Database for Standard Reference, Release 24. U.S. Department of Agriculture, caramel candy and chocolate ; 7 pages.*
Brouns et al. "Physiological and Physiological and Metabolic Properties of a Digestion-Resistant Maltodextrin, Classified as Type 3 Retrograded Resistant Starch", J. Agric. Food Chem., 2007, 55 (4), pp. 1574-1581.*
Zarazoga et al. "Resistant starch as functional ingredient: A review"; Food Research International vol. 43, Issue 4, May 2010, pp. 931-942.*
International Search Report for PCT/DK2007/050167 dated Mar. 19, 2008.
Von Rymon Lipinski, Gert-Wolfhard "Intense sweeteners: Status and new developments" International Sugar Journal, 2003, pp. 308, 310-312, vol. 105, No. 1255—Abstract.

(Continued)

*Primary Examiner* — Jyoti Chawla
(74) *Attorney, Agent, or Firm* — Knobbe, Martens, Olson & Bear LLP

(57) ABSTRACT

The present invention relates to sweet confectionery products, in particular sweet confectionery products—with reduced content of sugar and calories. The present invention furthermore relates to methods for producing such products, the present invention relates to gelled low calories sweet confectionery products comprising at least one intensive sweetener, at least one texture giving agent, and two or more low calorie bulking agents.

22 Claims, No Drawings

(56) References Cited

FOREIGN PATENT DOCUMENTS

| | | |
|---|---|---|
| JP | 60-114149 A | 6/1985 |
| JP | 3-251533 A | 11/1991 |
| JP | 2001-521727 A | 11/2001 |
| JP | 2003-212759 A | 7/2003 |
| JP | 2005-168404 A | 6/2005 |
| WO | WO 98/04156 | 2/1998 |
| WO | WO 98/20860 | 5/1998 |
| WO | WO 00/69275 | 11/2000 |
| WO | WO 01/17370 A1 | 3/2001 |
| WO | WO 01/97631 A1 | 12/2001 |
| WO | WO 02/071857 A1 | 9/2002 |
| WO | WO 2004/004241 A1 | 1/2004 |
| WO | WO 2006/015880 A1 | 2/2006 |
| WO | WO 2006/047151 A1 | 5/2006 |

* cited by examiner

SWEET CONFECTIONERY PRODUCTS

CROSS REFERENCE TO RELATED APPLICATION

This application claims the benefit and priority to and is a U.S. National Phase of PCT International Application Number PCT/DK2007/050167, filed on Nov. 9, 2007, designating the United States of America and published in the English language, which is an International Application of and claims the benefit of priority to Danish Patent Application No. PA 2006 01464, filed on Nov. 9, 2006, and U.S. Provisional Application No. 60/858,221, filed Nov. 9, 2006. The disclosures of the above-referenced applications are hereby expressly incorporated by reference in their entireties.

FIELD OF INVENTION

The present invention relates to the field of sweet confectionery products. In particular, the present invention relates to sweet confectionery products with reduced content of sugar and calories. The present invention furthermore relates to methods for producing such products.

BACKGROUND OF THE INVENTION

Traditional sweet confectionery products comprise a gelled/boiled mass having sugar as a main ingredient. Sugar contributes with sweetening and bulking effects. Sugar also has relatively high calorie content (about 4 kcal/g) and it contributes to a relatively fast elevation of blood glucose upon consumption. The two latter effects are undesirable for people who are conscious about their body weight and/or suffer from diabetic diseases and/or stick to low carbohydrate diets.

A solution to the problems connected with traditional sweet confectionery products is full or partial substitution of sugar with sugar alcohols. Sugar alcohols also have sweetening and bulking effects. Consumption of sugar alcohols do not result in a fast elevation of blood glucose and the calorie content is also significantly reduced (normally about 15-50%) compared to the calorie content in table sugar. This product is therefore some times recommended to diabetic patients and weight conscious consumers. However, in many places such as e.g. in Denmark, use of sugar alcohols is not recommended for use as a sugar replacement for diabetic patients. Sugar alcohols furthermore have an undesired laxative effect and many consumers do not think that the calorie content of sugar alcohol containing products is sufficiently reduced compared to the calorie content in sugar containing products.

Various sweet low calorie products without sugar alcohols have been suggested in the art: U.S. Pat. No. 6,423,358 and EP 1629730 relate to a low calorie table sugar substitute consisting of fibers in combination with high intense sweetener.

EP1210880 discloses the use of sucralose in food products, and in particular the ability of sucralose to mask unpleasant tastes. Other sweeteners may also be used such as e.g. polydextrose. It is disclosed how to produce hard candy using trehalose, syrup, and sucralose.

Chewing gum comprising dietary fibers and high intensive sweeteners are also known in the art. Chewing gum comprises a gum base which is essentially insoluble in aqueous solutions and thus only intended for chewing but not for oral intake.

However, within the field of gelled low calorie confectionery products it has thus far not been possible to find any appropriate bulking agents other than sugar alcohols and sugar. The explanation most likely being that no single substitute results in a confectionery product with acceptable sensory properties (texture, mouth feel, etc.) and acceptable digestive properties. In particular, this problem has been pronounced in connection with production of confectionery products on an industrial scale. There is therefore a great need in the art for low calorie gelled confectionery products with a calorie content that is significantly reduced compared to traditional sugar reduced or sugar free products. There furthermore exists a great need in the art for a low calorie gelled confectionery product with reduced undesirable laxative and/or blurting effects and/or undesired off-taste. There furthermore exists a need in the art for a product that combines these advantageous properties with an acceptable shelf life. The global market for such products would potentially be very big since the potential consumers include people who like sweet confectionery products including diabetic patients and/or people who are body weight conscious and/or overweight.

It follows that there exists a need in the art for low calorie gelled products that do not cause significant digestive discomfort upon normal consumption, wherein such products preferably can be produced by conventional methods using conventional equipment.

SUMMARY OF THE INVENTION

The problems stated above are solved by partial or full replacement of sugar alcohols and sugar by combining two or more low calorie bulking agents with at least one texturizing agent and at least one high intensive sweetener.

The present invention thus relates to a gelled low calorie confectionery product comprising high intense sweetener and two or more low calorie bulking agents. The products surprisingly have excellent sensory properties as well as an acceptable shelf life. In comparison with products based on sugar and/or polyols, the products according to the present invention furthermore have reduced calorie content while undesired side effects, such as e.g. laxative effects and/or blurting, are reduced, preferably highly reduced or avoided. The present invention furthermore relates to methods for producing such products.

DETAILED DESCRIPTION OF THE INVENTION

Definitions:

Gelled low calorie sweet confectionery products: Gelled confectionery products are solid food compositions that include soft and/or chewable and/or gummy like sweet candy products such as e.g. gums and jellies, liquorice, and other moulded or extruded products. Some products (such as e.g. pastils) may even be rather hard and somewhat crispy or crunchy prior to ingestion and gradually become relatively soft/chewable upon contact with saliva in the mouth.

The products are based on a cooked mass that may subsequently be e.g. extruded or moulded and/or aerated. The products may also be combination products such as e.g. extruded products optionally filled with a non-gelled/non-boiled sugar mass or it may be stacked combination products such as e.g. liquorice allsorts. It may also be confectionery of the dragée type, i.e. panned confectionery products with an outer crunchy layer. An important feature of the gelled low calorie confectionery products according to the present invention is that the calorie content is significantly decreased compared to products based primarily on sugar and/or traditional sugar-free products based on sugar alcohols. Gelled low calorie confectionery products thus have a calorie content that is at least 30% reduced, preferably at least 35% reduced, more preferably at least 40% reduced, even more preferably at least 45% reduced and most preferably at least 50% reduced compared to traditional products and/or products based primarily on sugar alcohols. In a particularly preferred embodiment, the calorie content is decreased 50-90%, such as e.g. 60-70%. The decreased calorie content is calculated according to the calorie values used in Example 6. Provided that other calorie values are used in calculating reduction of calorie content, it is plausible that slightly different results might be obtained.

Another characteristic for the gelled low calorie confectionery products according to the present invention is that it is a solid food composition with a three dimensional molecular network formed in connection with the gelling/boiling procedure resulting in products with elastic properties. The three dimensional network is normally conferred by addition of texture giving agents/fillers prior to boiling of the confecture mass. In fact, the confectionery products according to the present invention would be in a somewhat fluid state rather than a solid state in the absence of texture giving agents. It should here be understood that confectionery products must not be too hard either and products which appear with an essentially crystalline and/or amorphous structures are thus not desirable in connection with the present invention. Generally, the gelled low calorie confectionery products according to the present invention have a water content of about 5-30%, preferably 15-25%.

Other confectionery product types such as e.g. nougat and chocolate comprise lipid in an amount such that the lipid content and/or the lipid molecular structure normally contributes to the texture of the product. According to the present invention however, lipid substances are normally only present in small amounts, preferably in minute quantities and the lipid substances do not contribute significantly to the texture or the bulk of the product. In connection with the present invention, lipids are typically introduced in connection with polishing the products and/or addition of flavours/inclusions/coating such as chocolate, nougat, caramel, nuts, yoghurt, milk components, etc. The total lipid content in products according to the present invention preferably does not exceed about 10% by weight. More preferably, the lipid content does not exceed 9, 8, 7, 6, 5, 4, 3, 2, or 1%. Most preferably, the total lipid content of products according to the present invention is less than 1% by weight.

It is finally a requirement that the confectionery products according to the present invention are perceived as sweet according to a trained sensory test panel.

Gums and Jellies:

Gums and jellies are chewy and firm sweets often referred to as e.g. "wine gums", "gum drops", etc. Gums and jellies are produced on basis of a cooked mass comprising water, sugars (and/or sugar alcohols), colours (optionally), flavours, and texture giving agents. The cooked mass may be subject to various treatments. It may e.g. be whipped, resulting in aerated and/or "foamy" products. If it is desired to obtain a "marshmellow-like" confectionery product, further foam aiding ingredients such as e.g. egg white may be added to the basis mass in order to improve the "spongy" texture. The cooked basis mass may furthermore be coated with e.g. a hard and/or crunchy outer shell (drageé/pan coating) or it may be sanded with e.g. table sugar, sugar granules, acid and/or ammonium chloride or dusted with starch, icing sugar, nut granules or cocoa granules.

Liquorice: Liquorice/licorice paste is found in a wide variety of liquorice candies. It should be noted, though, that in some of these candies the taste is reinforced by aniseed oil, and the actual content of liquorice is quite low. Other herbs and spices of similar flavour include star anise, and menthol. A wide variety of licorice candies are produced around the world. In the U.S., the most common form of licorice candy is known as black licorice and normally consists of chewy ropes or tubes. In the Commonwealth a mixture of various licorice candies is known as liquorice allsorts. In the Netherlands and Nordic countries, some licorice candy is salty and comprises licorice extract together with ammonium chloride. The liquorice extract confers a black colour to the product. However, if desired the black colour may be further strengthened by the use of e.g. carbon black and/or malt as food colouring agent(s). There are also products known as "red licorice" made with fruity flavours rather than licorice and/or in addition to licorice. It thus follows that the colour of "red licorice" may vary from from brightly coloured to black or almost black. The fruity flavours include e.g. apple, mango, blackcurrant, lemon, orange, pineapple, strawberry, black berries, etc. The colour of the product may vary accordingly.

It follows that it may in some cases be difficult to make a clear distinction between wine gum and licorice products.

Hard candy/bon bon: Hard candy products usually consist of a solid composition with an essentially crystalline and/or amorphous structure. Bulking agents can be one or more of sugar, sugar alcohols, polymers, etc. Hard candies are intended for crushing by the teeth and/or sucking. Hard candy products normally do not contain texturizing agents. Hard candy products thus contain essentially no water.

Sugar: Sugar is defined as commonly used and naturally occurring carbohydrates (mono- and disaccharides) with a sweetening effect. Examples include table sugar (sucrose/saccharose), fructose, lactose, glucose, threalose, honey, syrup, etc. According to the present invention addition of sugar is preferably avoided. However, the present invention also includes products with relatively small amounts of sugar, i.e. not more than 20% by weight, preferably not more than 15%, more preferably not more than 10%, most preferably not more than 5%, and even most preferably not more than 1%. The calorie content of sucrose is on average about 4 kcal/g. In addition, products according to the present invention may furthermore contain minor amounts of sugar derived from bulking agents and/or texturizing agents. It follows that the amount of intense sweetener may be varied accordingly depending on how much sweetness is added by addition of ingredients such as e.g. polydextrose and other polymeric compounds.

Sugar alcohols: Sugar alcohol (also known as a polyol, polyhydric alcohol, or polyalcohol) is a hydrogenated form of carbohydrate, whose carbonyl group (aldehyde or ketone, reducing sugar) has been reduced to a primary or secondary hydroxyl group. They are commonly used for replacing sugar in foodstuffs, often in combination with high intensity artificial sweeteners to counter the relatively low sweetness. Some common sugar alcohols are: maltitol, mannitol, sorbitol, xylitol, isomalt, lactitol, and erythritol. Disaccharides and monosaccharides can both form sugar alcohols; however, sugar alcohols derived from disaccharides (eg Maltitol and lactitol) are not entirely hydrogenated because only one aldehyde group is available for reduction.

Sugar alcohols are usually incompletely absorbed into the blood stream from the small intestines which generally results in a smaller change in blood glucose than "regular" sugar (sucrose). The calorie content of sugar alcohols ranges between about 1.5 up to about 4 kcal/g—except some sugar alcohols such as e.g. erythritol which contributes 0.2 kcal/g. Even though erythritol has a low energy content, this sugar alcohol is not normally applicable for use in sweet low calorie gelled confectionery products according to the present invention due to its "cooling" effects which is not normally applicable within sweet confectionery production. However, for some applications according to the present invention, use of sugar alcohols with a "cooling effect" such as e.g. erythritol may be desirable, e.g. in combination with mint flavours.

This low calorie property makes sugar alcohols popular sweeteners among diabetics and people on low-carbohydrate diets. For most sugar alcohols, the majority of the calorie contribution originates from fermentation processes in the gut. However, as for many other incompletely digestible substances (such as dietary fiber), consumption of sugar alcohols can lead to bloating and diarrhea because they are not absorbed in the small intestine. As an exception, some sugar alcohols such as e.g. erythritol are actually absorbed in the small intestine and excreted unchanged through urine, so it has no side effects at typical levels of consumption. Furthermore, sugar alcohols are not normally metabolized by oral bacteria, and so they do not contribute to tooth decay and they do not brown or caramelize when heated.

According to the present invention addition of sugar alcohols is preferably avoided. However, the present invention also includes products with relatively small amounts of sugar alcohols, i.e. not more than 20%, preferably not more than 15%, more preferably not more than 10%, most preferably not more than 5%, and even most preferably not more than 1%, such as e.g. 0-1%.

High intensive sweeteners: include sweeteners that are perceived as manifold more sweet than table sugar and their energy contribution is therefore neglible. Examples thereof include:

Acesulfame potassium (and other salts thereof)—200× sweetness (by weight), E950
Alitame—2,000× sweetness (by weight)
Aspartame—160-200× sweetness (by weight), E951
Aspartame-Acesulfame-Salt—350× sweetness (by weight), E962
Cyclamate—30× sweetness (by weight), E952
Dulcin—250× sweetness (by weight)
Neohesperidine dihydrochalcone—1,500× sweetness (by weight), E959
Neotame—8,000× sweetness (by weight)
P-4000—4,000× sweetness (by weight)
Saccharin—300× sweetness (by weight), E954
Sucralose—600× sweetness (by weight)
Thaumatin, E957—3000× sweetness (by weight)

Sweetening intensities may vary according to different assay conditions and/or sensory panels.

According to the present invention it is possible to obtain a low calorie gelled confectionery product with excellent sensory properties with little or preferably no addition of sugar or sugar alcohols and without exceeding recommended amounts of intense sweetener. Furthermore, it is possible to produce a low calorie gelled confectionery product with virtually no undesired after taste. High intensive sweetener is added in an amount according to the "potency" of the sweetener in question and furthermore in an amount that results in a product with a desired sweetness according to a trained sensory test panel.

However, the present invention also embraces embodiments wherein intense sweetener is present in even higher amounts than what is allowed most places in the world.

Preferred intensive sweeteners include those that are fully or partly devoid of metal ions, since presence of metal ions tend to result in an undesired after-taste.

A particularly preferred intense sweetener is Aspartame-Acesulfame-Salt (E962), being essentially devoid of metal ions. Aspartame-acesulfame salt is preferably added in an amount of about 0.05-0.2% by weight, preferably 0.05-0.1%. Using acesulfam potassium in combination with aspartame, preferably in a 1:1 molar mixture, also results in a very good sweetening effect, although with a slight metallic off-taste. In connection with the present invention, Aspartame-acesulfam salt and/or acesulfam potassium in combination with aspartame surprisingly has a synergistic effect when combined with flavours perceived as sweet. The effect of this combination is a surprisingly sweet product thus reducing the required amount of high intensive sweetener. It is even more surprisingly that reduced amount of intense sweetener in combination with flavours perceived as sweet result in products with essential no off-taste. Normally, addition of intense sweeteners will almost always be apparent to a people trained in detecting minor changes in flavour and texture.

The reduction of intense sweetener has been recorded to about 10-25%, such as 15-20% in comparison with the amounts that would normally be expected in order to arrive at the desired level of sweetness. Sucralose also contributes with a good sweetening effect, but sucralose is relatively expensive compared to aspartame-acesulfame salt. This synergistic effect is highly advantageous since there is a need in the art for low calorie products with reduced amounts of high intensive sweetener. In some animal studies, high intensity sweeteners have been associated with potential undesired effects. It is at present uncertain if there are any risks associated with intake of high intensity sweeteners. Furthermore, there exists a need in the art for masking the off-taste associated with intense sweeteners, and this need seems to be met in connection with the present invention, in particular in connection with combination of a sweet flavour and reduced amounts of intense sweetener.

Texture giving agents: The terms "texturizing agents", "texture giving agents", and "gelling agents" are used interchangeably. Texturizing agents are defined as compounds with the capability of modulating the texture of the product without contributing with a significant increase in energy content. Examples of texturizing agents include gelatine, pectin, starch such as e.g. natural and/or modified starch, carrageenan (lambda, iota, kappa), gum arabic, gellan gum, agar-agar (identical to "agar"), etc. Preferred modified starch according to the present invention includes modified starch derived from corn, wheat, pea, potato, tapioca, bamboo, or any possible combination thereof. Preferred gelatine according to the present invention includes gelatine derived from e.g. fish, bovine, pig, etc., or combinations thereof.

The choice and/or amounts of texturizing agents(s) in a confectionery product can normally modulate product texture to a very high degree. In fact, presence of texturizing agents is in most cases fully or partly responsible for the elastic and/or solid properties of the gelled low calorie sweet confectionery products according to the present invention. In a preferred embodiment according to the present invention, texturizing agents are present in an amount of from 5-50% by weight, more preferably, 10-40%, and most preferably 20-30% by weight.

Starch, native or modified, is gained from cereal grains (e.g. maize, waxy maize, wheat or rice) or tubers (e.g. potato or tapioca) or pulses such as e.g. pea. Confectionery based on starch will give soft to sticky textures depending on the starch level, heating temperature and type. High level of starch may result in a grainy mouth feel. In industrial scale production of products according to the present invention, it has turned out that it is preferable to use e.g. pea starch rather than potato starch in production of some wine gum products. Use of pea starch rather than potato starch for such applications seems to result in more efficient moulding processes.

Gelatine, derived from pig, bovine, fish or other animal sources, result in a firm, gummy gel structure. Depending on bloom strength (higher bloom strength giving a harder gel) and concentration, the texture of the confectionery product will be elastic to hard with a rubbery like chew. Gelatine types with high bloom factors generally favour formation of "hard" and "chewy/elastic" products, whereas gelatine types with low bloom factors generally favour formation of "soft" products. According to the present invention it surprisingly appears to be relatively difficult to control the hardness of the products by varying gelatine bloom strength. It appears to be easier to obtain the desired hardness of the product by varying the total amount of gelatine. Both bovine and pig gelatine types seem to work well in connection with the present invention.

Pectin (e.g. from citrus peels or apple pomace) gives a soft texture with a short bite.

Gum Arabic (gum acacia) causes a smooth melting mouth feel. Depending on the concentration of gum Arabic, the confectionery product will be firm and hard to brittle and crunchy. According to the present invention, wine gums based on gum arabicum and starch tend to result in products with a relatively tough bite and wine gums based on gum arabicum and gelatine tend to result in products with a relatively short bite.

Extracts from seaweed (e.g. Carrageenans, alginates and agar) can be combined with other texture giving ingredients in order to stabilize the texture of the confectionery product and provide a soft gel.

Galactomannan gums (Locust bean gum and guar gum) are used mainly to stabilize the gelling of other texture giving compounds giving a more firm gel, increasing gel strength and modifying the gel structure.

Gellan gum is a polysaccharide with glucose, rhamnose and glucuronic units produced by fermentation. Gellan gum gels has high gel strength and may result in firm, brittle, or soft elastic gels depending on the acyl groups in the molecules. According to the present invention, however, gellan gum tends to result in unclear and gritty products.

Products according to the present invention comprise texturizing agents in an amount of from about 1-60% by weight, preferably 5-50%, and most preferably 10-40%.

Bulking agents: The terms "low calorie fibers" and "low calorie bulking agents" are used interchangeably. Low calorie bulking agents according to the present invention are edible fibers defined as polymeric compounds with the capability of adding bulk while contributing with a calorie content that is significantly lower than e.g. sugar and sugar alcohols. Preferably, such fibers are water soluble. Examples thereof include: fructans, inulin, oligofructose, polydextrose, indigestible dextrins such as e.g. wheat dextrin, etc. or any possible combination thereof. The calorie content of these compounds is relatively low because only a fraction of the fibers are digested during passage through the digestive tract. However, most of these fibers are subject to fermentation processes during passage through the digestive tract. According to some studies, it appears that different bulking agents/fibers may favour flourishing of different types of intestinal bacteria.

Each type of fiber is fermented different places in the digestive tract. It thus follows that use of only one fiber as a sugar and/or sugar alcohol replacement may result in digestive discomfort in the form of e.g. a local osmotic pressure, a local high concentration of short chained fatty acids, etc. Replacement of sugar and/or sugar alcohols with a bulking agent will thus potentially lead to digestive discomfort upon consumption of the replacement product. Some commercially available low calorie bulking agents (e.g. polydextrose) are thus often provided with guidelines with regard to recommended average daily maximum intake.

By using more than one bulking agent/low calorie fiber according to the present invention, each fiber is used in relatively low amounts and the local concentration of fermenting fibers is thus decreased, leading to reduced digestive discomfort upon ingestion.

According to the present invention, two, three, four, five, six or more different bulking agents may be used. The total amount (by weight) of bulking agents in the confectionery products according to the present invention thus ranges from 20-90%, preferably 30-80%, more preferably 40-70%, and most preferably 50-60%.

Fructans: A fructan is a polymer of fructose molecules. They occur in foods such as: artichokes, asparagus, green beans, leeks, onions (including spring onion), and wheat.

There are 3 types of fructans:
Inulin—linear fructans generally linked by $\beta(2,1)$ glycosidic bonds
Levan—linear fructans generally linked by $\beta(2,6)$ glycosidic bonds
Graminan—branched fructans linked by both $\beta(2,1)$ and $\beta(2,6)$ glycosidic bonds.

Inulin: Inulins are a group of naturally occurring oligosaccharides (several simple sugars linked together) produced by many types of plants. Inulin is used by some plants as a means of storing energy and is typically found in roots or rhizomes. Most plants which synthesize and store inulin do not store other materials such as starch.

Inulin is used increasingly in foods, because it has excellent nutritional and functional characteristics. It ranges from completely bland to subtly sweet and might thus be used to replace ingredients such as sugar, fat, and flour. Inulin contains one-third to one-fourth the food energy of sugar or other carbohydrates. It may also increase calcium absorption and possibly also magnesium absorption, and promote growth of probiotic bacteria. Inulin has a minimal impact on blood sugar, making it generally considered suitable for diabetics and potentially helpful in managing blood sugar-related illnesses. Use of large concentrations of inulin may however result in relatively hard products, an effect which is usually undesirable in connection with production of gelled confectionery products.

Oligofructose: Oligofructose is a subgroup of inulin. Unlike most carbohydrates, it is not digested in the human small intestine and thus has a lower calorific value, whilst contributing to dietary fiber. Oligofructose is on the more soluble side, due to its lower chain length, than the general class of inulins and is therefore commonly used as an additive to yoghurt and other dairy products. It may be used in combination with high-intensity artificial sweeteners, whose sweetness profile and aftertaste it improves. Oligofructose is also a prebiotic stimulating the growth of bifidobacteria in particular.

Oligofructose contributes with a bulking effect and it furthermore may result in a slight sweetening effect without contributing with any "dry" or "sandy" mouth feel. However, relatively large intake of oligofructose (above about 20 grams per day) is associated with digestive discomfort. Oligofructose furthermore tends to be unstable in an acidic environment. As a consequence, glucose units may be released resulting in an increased energy contribution. In a preferred embodiment according to the present invention, oligofructose is present in an amount of 1-20% by weight, more preferably, 2-15%, and most preferably 5-10% by weight.

Indigestible dextrins: Dextrins are a group of low-molecular-weight carbohydrates produced by partial hydrolysis of starch. Indigestible dextrins are essentially resistant to digestion. Like dietary fibers, indigestible dextrins pass through the intestinal system usually being subject to fermentation. Dextrins find widespread use in industry, due to their non-toxicity and low price. Dextrins are typically derived from wheat, barley, corn, or potato. In a preferred embodiment according to the present invention, indigestible dextrin is present in an amount of 1-20% by weight, more preferably, 2-15%, and most preferably 5-10% by weight.

Polydextrose (E1200): Polydextrose is a white or milky white noncrystalline powder. Polydextrose is a polymer of D-glucose with some bound sorbitol and citric acid. Polydextrose is a polysaccharide composed of randomly cross-linked glucose with all types of glycosidic bonds, containing minor amounts of bound sorbitol and acid. Its E number is E1200 and it was FDA approved it in 1981. Polydextrose contributes with bulk and only a low calorie content. Polydextrose result in a somewhat transparent confectionery product. High concentrations often results in products with poor sensory properties. In a preferred embodiment according to the present invention, polydextrose is present in an amount of about 5-50% by weight, more preferably 10-40%, and most preferably 15-30% by weight.

E-numbers: E-numbers are codes for food additives according to the European Union and the International Numbering System.

Flavours: Flavours might be used alone or in any possible combination in connection with the present invention. Examples of flavours include: flavours and/or extracts and/or aromatic oils, essential oils derived from fruit and berries (e.g. banana, raspberries, apple, mango, papaya, mamey, citrus, etc.), vegetables (e.g. cucumber, rhubarb, tomato, carrot, etc.), nuts (e.g. hazel nuts, almonds, pine nuts, cashew nuts, etc.), spices (e.g. basil, cardamom, cinnamon, thyme, etc.), flowers (e.g. Rose, elder flower, lavender, lavender, etc.), herbs (e.g. asparagus, mountain ash, etc.), roots (e.g. liquorice/licorice), plants (e.g. vanilla, mint, fir, tea, etc.) as well as various other sources (e.g. propolis and honey). Flavours furthermore comprise ingredients/flavours such as cocoa, chocolate, caramel, caramel essence, nougat, nougat essence, marzipan, almond essence, oils, liquor, brandy, rum, port, whiskey, wine, etc.

Flavours perceived as "sweet" according to a trained sensory panel are particularly preferred according to the present invention. In general, flavours from fruits, berries, and flowers, are perceived as "sweet". But also flavours like rhubarb, cinnamon, liquorice, vanilla, mint, chocolate, nougat, caramel, marzipan, sweet liquors, propolis, and honey may be perceived as sweet. Use of most "sweet" flavours in combination with reduced amounts of intense sweetener surprisingly result in product with the desirable level of sweetness and a highly desirable flavour where essentially no intense sweetener related off-taste can be detected. In fact, combination of intense sweeteners with "sweet" flavours may allow a reduction of intense sweetener of up to 5-35%, or 10-20% compared to the amount of intense sweetener that would normally have been expected in order to arrive at a product with the desired sweetness.

Colours: Food colours are added to confectionery products to obtain brightly and deliciously coloured products. The colours are often associated with a specific group of flavours. As an example, red colour favours perception of e.g. the taste of red fruits. Natural colours extracted from e.g. plants, vegetables, fruits, insects, etc. are preferred in connection with the present invention. The yellow Curcurmin is e.g. extracted from turmeric. Copper Chlorophyll is a natural green food colouring which is extracted from nettles, grass and alfalfa. Cochineal is used to produce scarlet, orange and other red tints known as carmine. Synthetic colours can also be used for food colouring. An example hereof is the "Azo" colours such as allura red, sunset yellow which have a chemically azo group azo. In a number of animal studies, however, azo colours have been associated with undesired effects, and they are therefore preferably not used in connection with the present invention. Other pigments used in confectionery are carbon black and titanium oxide. According to the present invention, naturally occurring colours are preferably used.

Acids: According to the present invention it is an advantage to add acidic compounds such as e.g. citric acid, acetic acid, ascorbic acid, malic acid, tartaric acid, or mixtures thereof in order to add freshness and to intensify flavours.

Addition of acid furthermore enhances formation of a three-dimensional network in connection with cooking/boiling/gelling of the confecture mass. The skilled person knows how to vary the amount and type of acid in order to obtain a product with the desired flavour and desired texture.

In a first aspect, the present invention thus relates to a gelled low calorie sweet confectionery product comprising at least one intensive sweetener, at least one texture giving agent, and two or more low calorie bulking agents. In a preferred embodiment, the product comprises a combination of polydextrose, oligofructose and indigestible dextrine, preferably 5-50% (by weight) polydextrose, 1-15% (by weight) oligofructose, and 1-15% (by weight) indigestible dextrine.

In a further preferred embodiment, at least one texture giving agent selected from gelatine, pectin, carrageenan, gum arabic, agar-agar, starch, modified starch, and mixtures thereof is present. Preferably, texture giving agents are present in an amount of about 5-50% (by weight).

According to a third preferred embodiment, intense sweetener(s) is partly or fully devoid of metal ions. A particularly preferred intense sweetener is aspartame-acesulfame salt.

According to a fourth preferred embodiment, one or more flavours are added to the confectionery product according to the present invention. Preferred flavours are flavours that are perceived as sweet.

According a fifth preferred embodiment, the confectionery product according to the present invention furthermore comprises acid, preferably organic acid.

According to a final preferred embodiment, the confectionery product according to the present invention is devoid of sugar and sugar alcohol.

In a second aspect, the present invention relates to a method of producing gelled low calorie confectionery product according to the present invention, wherein said method comprises mixing two or more low calorie bulking agents with at least one intensive sweetener and at least one texture giving agent.

In a particularly preferred embodiment, the products are stored at room temperature for at least a month. In yet other embodiments storage of the products after production is not necessary in order to obtain products with the desired texture.

The invention is further demonstrated in the following non-limiting examples:

EXAMPLES

Methods and equipment that are normally used in production of gelled confectionery products are used in the examples of the present invention.

Example 1

Wine Gum:

Texture giving agents (gelatine and/or modified starch) are dissolved in a relatively small amount of water (5-30% by weight) in a tank under continuous stirring. Smaller amounts of water tend to result in relatively hard products, and higher amounts of water tend to result in soft products that may be difficult to dry and/or set. High intensive sweetener(s) is added. In a separate tank, the low calorie fibers are likewise dissolved in a relatively small amount of water. In a third tank, the two solutions are mixed in an appropriate ratio. The resulting solution mixture constitutes the unboiled basis mass.

The unboiled basis mass is subsequently cooked at 100-130° C., preferably 120-130° C. at 1-2 bar. For some applications it is furthermore essential to avoid that the temperature reaches 130° C. or more, since these high temperatures favour formation of caramelisation processes, in particular in products where sugar is present. During this heating step, all ingredients are dissolved and a stabilising three-dimensional network is formed. The cooked basis mass is subject to vacuum immediately after the heating step. A dry matter content of about 65-75% is thus obtained and air bubbles are furthermore removed or reduced.

An acidic solution might be added to the cooked basis mass in order to intensify the flavours and to add freshness. Acid addition furthermore affects the ability of the ingredients to form a three-dimensional network and thus affects the texture of the final product. Too high as well as too low acid concentrations might impair with this stabilising effect.

Flavour solutions might be added before leading the aerated hot mass to a heated moulding depositor. The mass is then continuously deposited in moulding starch with preformed grooves in desired shapes. Depending on the ingredients, the moulded products may be either cooled e.g. at room temperature or it might be heated in a drying chamber and subsequently cooled.

According to the present invention, it appears that relatively long heat treatment of the moulded mass tend to result in products with decreased form stability, hard products when using gelatine as a texturizing agent and sticky chewiness when using gelatine in combination with starch. However, a short heat treatment after moulding may result stickiness of the products. According to a preferred embodiment of the present invention, the heating step in connection with drying the products can preferably be circumvented resulting in a simplified production process and products that do not become too hard.

The cooling/drying process may take up to 2-4 days. The moulding starch is subsequently removed from the products and the surface can be sealed by polishing the products with e.g. an oil/wax mixture.

According to the present invention, however, it appears that storage of the products result in products with improved sensory properties. Products comprising a mixture of gelatine and starch result in products with sensory properties that are similar to conventional wine gums after about three months storage at room temperature. Furthermore, products with "sticky" properties tend to become less sticky after storage for about three months. The products according to the present invention are thus stored for at least a month, and even more preferably about three months. The products are preferably stored at room temperature (about 15-25° C.), preferably in air- and liquid tight containers.

It appears that products according to the present invention in contact with the air will gradually become relatively hard after a few days or about a week. It is thus preferred to store the products in sealed, and/or air tight, and/or water tight containers immediately or soon after production in order to avoid or reduce hardening.

It also follows that it is an advantage to sell the confectionery products according to the present invention in relatively small amounts packed in sealed containers such as small plastic bags. It is particularly advantageous to pack the products in plastic bags with a "zipper" mechanism ensuring the freshness and the desired texture of the product even after opening of the bag—provided that the bag is closed again after use.

"Small" plastic bags are typically intended to contain about 1 kg, more preferably about 750 g, more preferably about 500 g, more preferably about 400 g, more preferably about 300 g, more preferably about 250 g, more preferably about 200 g, more preferably about 150 g, more preferably about 100 g, more preferably about 50 g, and most preferably 20-100 g of the product according to the present invention.

Example 2

Licorice:

Texture giving agents (gelatine and/or modified starch and/or Gum Arabic) are dissolved in water in a tank under continuous stirring. High intensive sweetener(s) and low calorie fibers are added. The resulting solution mixture constitutes the unboiled basis mass.

The unboiled basis mass is subsequently cooked at 120-130° C. at a pressure of 1-2 bar. For this application it is essential to avoid that the temperature reaches 130° C. and above, since high temperatures favour formation of caramelisation, in particular in products where sugar is present, but also for overcooking starch granulates. During this heating step, all ingredients are dissolved and starch granulates swallow and gelatinize. The cooked basis mass is subject to vacuum immediately after the heating step. A dry matter content of about 65-75%, preferably 65-70% is thus obtained and air bubbles are furthermore removed or reduced.

Salt, ammonium chloride, liquorice paste and flavours are added before leading the hot mass to a heated moulding box comprising corn flour with preformed grooves in desired shapes. The mass is subsequently moulded in the corn flour grooves. The moulded mass will be heated at 70-80° C. in a drying chamber for up to about 40 hours and subsequently cooled. The powder is subsequently removed from the moulded products and the surface can be sealed by polishing agents e.g. an oil/wax mixture.

The resulting products are hard and somewhat brittle with a relatively tough and elastic bite. It is thus possible to obtain a licorice product with excellent sensory properties.

Production of e.g. licorice pastils according to the present invention using Gum Arabic result in products that are almost identical in flavour and texture to traditional products based on sugar.

Industrial scale production of licorice results in excellent products that are indistinguishable from the traditional products based on sugar with respect to texture, flavour, etc.

Example 3

Wine Gum:

Polydextrose (50%), wheat dextrin (10%) and oligofructose (15%) are dissolved in 60° C. hot water (25%) in a tank under continuous stirring (MASS 1). In a separate tank, gelatine 220 bloom (25%), modified starch (20%) are dissolved in 80° C. hot water (54.3%) and high intensive sweetener (0.7%) is added (MASS 2), also under continuous stirring. MASS 1 and MASS 2 are mixed in a 2:1 ration, in a third tank. The resulting solution mixture constitutes the unboiled basis mass.

The unboiled basis mass is subsequently cooked at approx. 120° C. at 1-2 bar. The cooked basis mass is subject to vacuum immediately after the heating step. A dry matter content of about 68-70% is thus obtained and air bubbles are furthermore removed or reduced.

After cooking a 50% citric acidic solution (1%) is added to the cooked basis mass in order to intensify the flavours and to add freshness. Acid addition furthermore affects the ability of the ingredients to form a three-dimensional network and thus affects the texture of the final product.

Flavour (approx. 0.05-0.1%) and colour (0.1-0.2%) solutions are added before leading the hot mass to a heated moulding box comprising corn flour with preformed grooves in desired shapes. The mass is subsequently moulded in the corn flour grooves.

The moulded mass is cooled at room temperature for 3-4 days. The powder is subsequently removed from the moulded products and the surface are sealed by polishing agent (0.1%) which consist of an oil/wax mixture. The resulting wine gum product has a number of desired properties such as a good shelf life, excellent flavour release, sweetness profile, and sensory properties resembling those of traditional wine gum with sugar.

Example 4

Aerated Products:

Texture giving agents (gelatine and/or modified starch) are dissolved in water (5-30% by weight) in a tank under continuous stirring. High intensive sweetener(s) is added. Flavour, acid solution and colour might be added at this stage. In a separate tank, the low calorie fibers are likewise dissolved in water. In a third tank, the two solutions are mixed in an appropriate ratio. The resulting solution mixture constitutes the unboiled basis mass.

The unboiled basis mass is subsequently cooked at 100-130° C. at 1-2 bar. For some applications it is furthermore essential to avoid that the temperature reaches 130° C. or more, since these high temperatures favour formation of caramelisation processes, in particular in products where sugar is present. During this heating step, all ingredients are dissolved and a stabilising three-dimensional network is formed. The cooked basis mass is subject to vacuum immediately after the heating step. A dry matter content of about 65-75% is thus obtained.

The cooked basis mass is then led through a whipping mixer to achieve a foamy and fluffy appearance. An acidic solution might be added to the cooked basis mass in order to intensify the flavours and to add freshness. Acid addition furthermore affects the ability of the ingredients to form a three-dimensional network and thus affects the texture of the final product. Too high as well as too low acid concentrations might impair with this stabilising effect.

Flavour solutions might be added before leading the aerated hot mass to a heated moulding depositor. The mass is then continuously deposit in moulding starch with preformed grooves in desired shapes. Depending on the ingredients, the moulded products may be either cooled e.g. at room temperature or it might be heated in a drying chamber and subsequently cooled.

The texture of the dried product can vary from foamy, soft and gummy like to less aerated, firm and even chewy products. This depends on the size and shape of the mould and/or ratio of the different ingredients and/or amount of air whipped into the product and/or drying time and temperature.

The cooling/drying process may take up to 2-4 days. The moulding starch is subsequently removed from the products and the surface can be sealed by polishing the products with e.g. an oil/wax mixture.

Example 5

Mixing and Dissolving the Ingredients:

The following general condition apply in connection with the present invention: a relatively small amount of water is used to dissolve a relatively large amount of dry ingredients. The difficulties in dissolving the ingredients according to the present invention are particularly pronounced in connection with large scale production methods, such as in industrial processes.

Various methods for dissolving and mixing the ingredients were thus tested in order to optimise various production methods contained herein. The following parameters were tested: mixtures with different amounts of raw material, mixing the ingredients in different orders, and use of different process equipment and process temperatures. Some of the conclusions obtained in these tests will be discussed in the following:

When dissolving the bulking agents it is preferred to add these compounds slowly, preferably stepwise under stirring/mixing in order to reduce the risk of clot formation. If one of the bulking agents constitutes a larger fraction of the total amount of bulking agent compared to any of the other bulking agents, then it may be preferable slowly/stepwise to dissolve that compound before dissolving the other bulking agents. If e.g. polydextrose is the major bulking agent, the risk of clotting may be reduced if polydextrose is dissolved slowly and/or stepwise before dissolving the other bulking agents.

Texture giving agents are dissolved in order to form a three dimensional matrix with the ability of binding and retaining water. Different texture giving agents sometimes require different dissolving temperatures and conditions. If the desired product according to the invention comprises two or more texture giving agents, it may be an advantage to add and dissolve the different compounds one at the time applying different conditions. If e.g. the desired product comprises both gelatine and starch as a texture giving agents, it may be an advantage to dissolve gelatine at a relatively high temperature (such as e.g. 70-80° C.) and subsequently adding and dissolving starch at a temperature of about 50° C., such as e.g. 45-55° C. If starch is dissolved under e.g. higher temperatures, then the viscosity of the solution may become too high, thus affecting process parameters such as e.g. pumping, mixing, etc.

It thus follows that production conditions may need to be adapted according to the specific mixture of ingredients.

Various types of equipment have been tested in connection with the present invention. If equipment with at least two tanks is used, it appears to be convenient to dissolve texture giving agents and bulking agents in separate tanks before mixing these two types of components.

In connection with equipment comprising a single mixing vessel, it appears that the order of mixing the ingredients as well as the temperature may need adjustment. The best results were obtained by dissolving one of the bulking agents, such as e.g. polydextrose, in two or three steps under continuous mixing/stirring. Intense sweetener was added after dissolving polydextrose. The remaining bulking agents were subsequently added. Finally, texture giving agents was/were added at an appropriate temperature(s).

It thus appears that several different types of equipment can be used in connection with the present invention.

Example 6

Energy Contents Compared with Traditional Sugar Confectionery Product:

| Energy giving components | Energy contribution | Energy reduction, % |
|---|---|---|
| Gelled confectionery with sugar | | |
| Glukose | 778 | |
| Sugar | 393 | |
| Gelatin | 144 | |
| Dextrose | 98 | |
| Citric acid | 21 | |
| Energy (kJ/100 g) in product: | 1434 | |
| Gelled confectionery with sugar alcohols | | |
| Maltitol | 587 | |
| Polydextrose | 0 | |
| Gelatin | 142 | |
| Sorbitol | 46 | |
| citric acid | 19 | |
| Energy (kJ/100 g) in product: | 793 | 45 |
| Gelled confectionery according to the present invention | | |
| Polydextrose | 0 | |
| Oligofructose | 114 | |
| Gelatin | 158 | |
| Wheat dextrin | 0 | |
| Modif. Starch | 134 | |
| Citric acid | 9 | |
| Energy (kJ/100 g) in product: | 414 | 71 |

Energy content has been calculated based on the pending guidelines of the Danish Veterinary and Food Administration (November 2006):

| | |
|---|---|
| Carbohydrate (not sugar alcohols): | 17 kJ/g and 4 kcal/g |
| Sugar alcohols: | 10 kJ/g and 2.4 kcal/g |
| Protein: | 17 kJ/g and 4 kcal/g |
| Fat: | 37 kJ/g and 9 kcal/g |
| Alcohol (ethanol): | 29 kJ/g and 7 kcal/g |
| Organic acid: | 13 kJ/g and 3 kcal/g |
| Oligofructose: | 8 kJ/g |
| Polydextrose: | 0 kJ/g |
| Wheat dextrin | 0 kJ/g |

Other legislations may use different guidelines for calculation of energy content—in particular with regard to calculating energy content of low calorie bulking agents.

The invention claimed is:

1. A gelled low calorie sweet confectionery product comprising:
    at least one intensive sweetener, at least one texture giving agent, and two or more low calorie bulking agents,
    wherein said product has a water content that is at least 5% and no more than 30% by weight, the product contains at least 5% and no more than 50% texture giving agent by weight, and the product contains no more than 15% sugar alcohols by weight,
    wherein the texture giving agent is selected from the group consisting of gelatin, pectin, carrageenan, gum arabic, agar-agar, starch, and mixtures thereof,
    wherein the low calorie bulking agents are selected from the group consisting of fructans, inulin, oligofructose, polydextrose, indigestible dextrins, and mixtures thereof, and
    wherein the gelled low calorie sweet confectionery product is a moulded, extruded, or shaped edible product.

2. Confectionery product according to claim 1, wherein oligofructose is present as one of the low calorie bulking agents.

3. Confectionery product according to claim 2, wherein the product includes at least 1% and no more than 20% oligofructose by weight.

4. Confectionery product according to claim 1, wherein said product comprises indigestible dextrins as one of the low calorie bulking agents.

5. Confectionery product according to claim 4, wherein the product includes at least 1% and no more than 20% indigestible dextrins by weight.

6. Confectionery product according to claim 1, wherein said product comprises a combination of polydextrose, oligofructose and indigestible dextrine.

7. Confectionery product according to claim 6, wherein said product comprises at least 5% and no more than 50% polydextrose by weight, at least 1% and no more than 15% oligofructose by weight, and at least 1% and no more than 15% indigestible dextrins by weight.

8. Confectionery product according to claim 1, wherein the gelled low calorie sweet confectionery product is a solid food composition with a three dimensional molecular network formed in connection with the gelling/boiling procedure.

9. Confectionery product according to claim 1, wherein the gelled low calorie sweet confectionery product is selected between gums, jellies and liquorice.

10. Confectionery product according to claim 1, wherein the intense sweetener(s) is partly or fully devoid of metal ions.

11. Confectionery product according to claim 10, comprising aspartame-acesulfame salt.

12. Confectionery product according to claim 1, comprising one or more flavours.

13. Confectionery product according to claim 12, comprising flavours that are perceived as sweet flavours.

14. Confectionery product according to claim 1, wherein said product comprises acid.

15. Confectionery product according to claim 1, wherein said product is devoid of sugar and sugar alcohol.

16. Confectionery product according to claim 1, wherein the starch comprises pea starch.

17. A method of producing a gelled low calorie confectionery product according to claim 1, wherein said method comprises mixing two or more low calorie bulking agents with at least one intensive sweetener and at least one texture giving agent.

18. A gelled low calorie sweet confectionery product comprising:
    at least one intensive sweetener, at least one texture giving agent, and two or more low calorie bulking agents,
    wherein said product has a water content that is at least 5% and no more than 30% by weight, the product contains at least 5% and no more than 50% texture giving agent by weight, and the product contains no more than 15% sugar alcohols by weight,
    wherein the texture giving agent is selected from the group consisting of gelatin, pectin, carrageenan, gum arabic, agar-agar, starch, and mixtures thereof, wherein the low calorie bulking agents are selected from the group consisting of fructans, inulin, oligofructose, polydextrose, indigestible dextrins, and mixtures thereof, and wherein the gelled low calorie sweet confectionery product is a solid food composition with a three dimensional molecular network formed in connection with the gelling/boiling procedure and maintains its texture when stored at room temperature for at least one month.

19. Confectionery product according to claim 18, wherein the product is a gum.

20. Confectionery product according to claim 18, wherein the product is a winegum.

21. Confectionery product according to claim 18, wherein the product is a jellie.

22. Confectionery product according to claim 18, wherein the product is a liquorice.

\* \* \* \* \*